United States Patent [19]

Hoffman

[11] 3,994,580
[45] Nov. 30, 1976

[54] OPTICAL SYSTEM FOR SCANNING DURING RECIPROCAL MOTION

[75] Inventor: Daniel S. Hoffman, Rochester, N.Y.

[73] Assignee: Xerox Corporation, Stamford, Conn.

[22] Filed: Feb. 24, 1975

[21] Appl. No.: 552,004

[52] U.S. Cl. .................................. 355/51; 355/8; 355/11; 355/66
[51] Int. Cl.² ................. G03B 27/48; G03B 27/50; G03B 27/70
[58] Field of Search ............... 355/66, 11, 53, 51, 355/8, 65

[56] References Cited
UNITED STATES PATENTS
3,574,459  4/1971  Hartwig ............................. 355/66

Primary Examiner—Richard A. Wintercorn
Attorney, Agent, or Firm—Robert J. Bird

[57] ABSTRACT

An optical system for strip scanning of an object in both directions of relative reciprocal motion between the object and the optical system. The object is first scanned in one direction, then the optical axis between object and image is rotated 180° for scanning in the reverse direction. Properly oriented images are thus projected onto a photoreceptor during both directions of scan.

4 Claims, 6 Drawing Figures

3,994,580

OPTICAL SYSTEM FOR SCANNING DURING RECIPROCAL MOTION

BACKGROUND OF THE INVENTION

This invention relates to optical systems and in particular to a strip scanning optical system for scanning an object and progressively projecting a composite image of the same at an image surface, such as a xerographic or other photosensitive surface in a photocopying process.

There are three general types of strip scanning arrangements known to the prior art. In one, the optical system is fixed and the object and photoreceptor move relative to the optics. In the second, the object is fixed and the optical system and photoreceptor move at appropriate speeds relative to the object. In the third, the object is fixed and is scanned by a rotating mirror to relay an image of the object onto a moving photoreceptor.

Typically, these prior art systems have in common the fact that they are capable of projecting a usable image only in one direction of scan motion. The return motion, whether it be return of the object, the optics, or the mirror, projects an image onto the moving photoreceptor which is disoriented (wrong reading) and therefore useless. Accordingly, the prior art has variously resorted to flyback arragements to minimize the "lost time" involved in the return motion of the scan mechanism. One system by which to accomplish scanning in both directions of object reciprocation is shown in U.S. Pat. No. 3,574,459 to Hartwig and Schnell, in which a single optical axis is rotated 180° between successive scans by a prism.

SUMMARY OF THE INVENTION

It is an object of the present invention to provide a novel form of strip scanning optical system which is capable of projecting a useful image of an object in both directions of reciprocal scan movement, thus greatly decreasing lost time in the operation of a photocopying apparatus.

Another object is to provide such a strip scanning optical system which does not require the cyclic reciprocation of the photoreceptor in addition to either the object or the optics.

Briefly, this invention is practiced in one form by an optical system having alternative optical paths between object and image. One of the paths includes an even number of reflectors more than the other path. The additional reflectors in the one path effect the 180° rotation the propagating image relative to its orientation in the other path.

For a better understanding of this invention, reference is made to the following detailed description given in connection with the accompanying drawings.

DRAWINGS

DESCRIPTION

Figure 1:
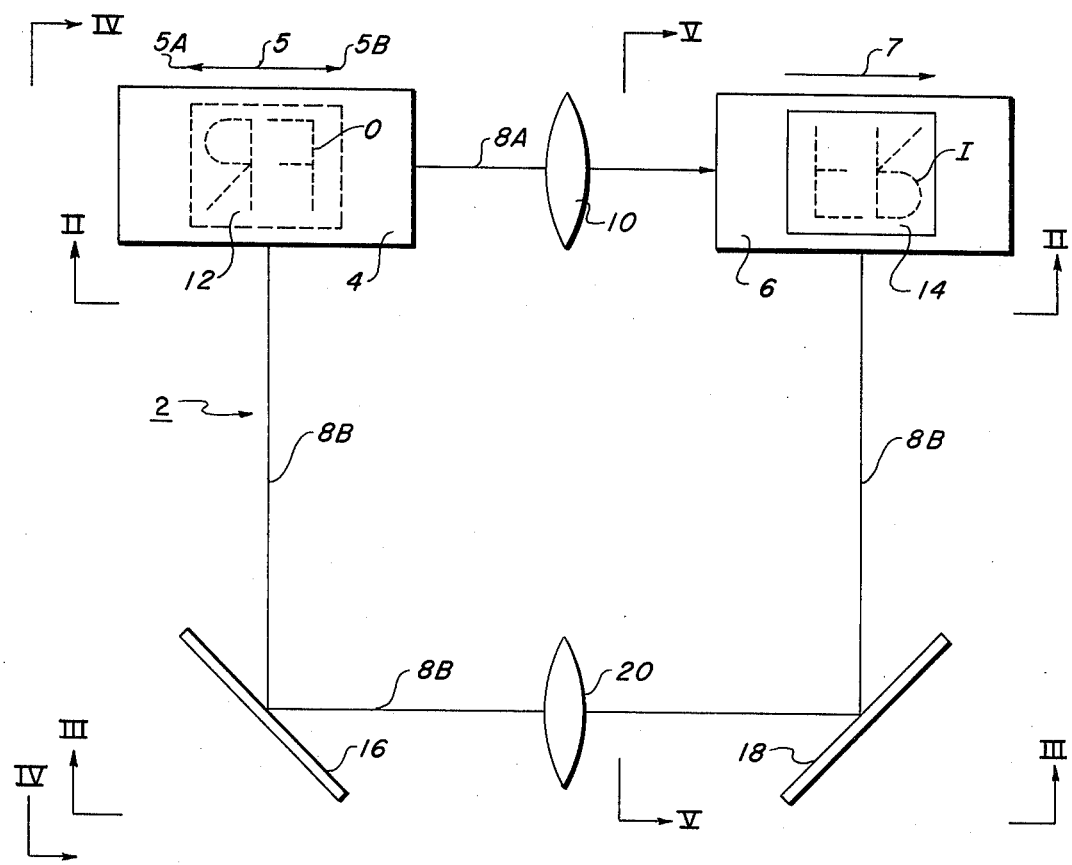
FIG. 1 is a plan view of an optical system according to the present invention and illustrating an image orientation in one direction of object scan.
Figure 2:
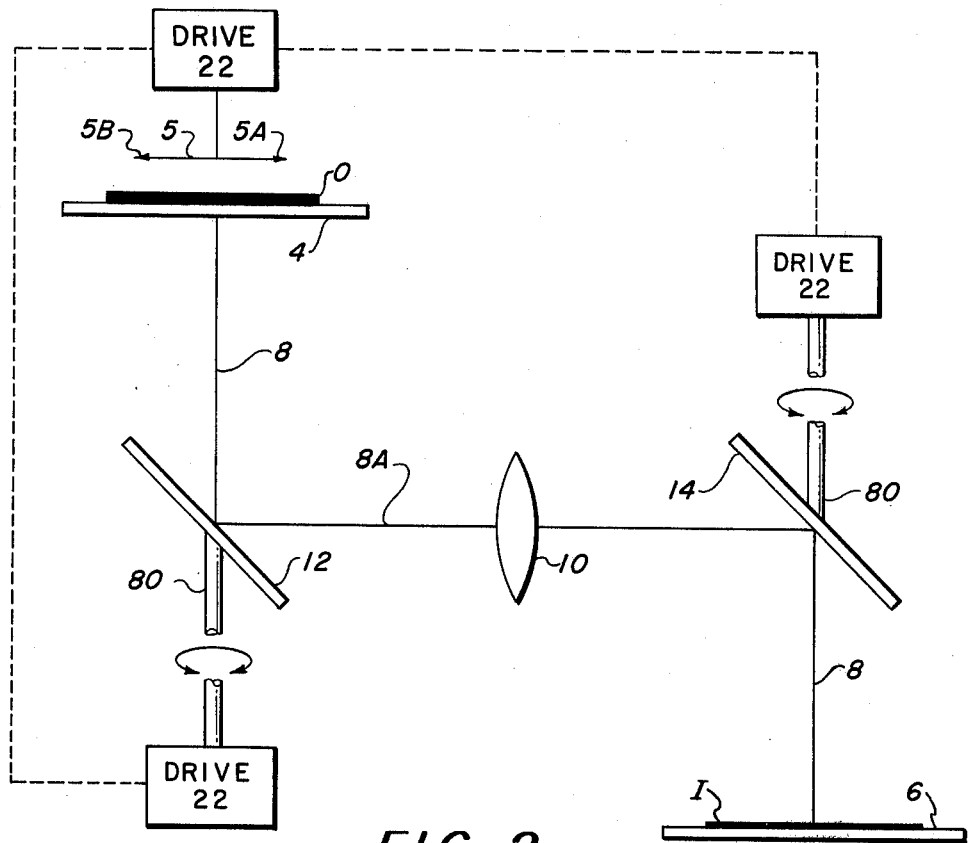
FIG. 2 is a front view taken along the line II—II of FIG. 1.

Referring now to FIGS. 1 and 2, the optical scanning system of this invention is generally indicated at 2 and extends between an object plane or surface 4 and an image plane or surface 6. The optical axis 8 of the system, includes parallel or alternate optical paths 8A and 8B and extends from object plane 4 to image plane 6.

FIG. 2 is a front elevation view of the first optical axis 8A and along with FIG. 1, shows a first reflector 12 and a second reflector 14, both of which fold the optical axis 8, and a projection lens 10 all disposed in optical alignment along the first optical axis 8A between the object plane 4 and the image plane 6. An object O on the object plane 4 is imaged at I by means of the projection lens 10 on the image plane 6. The object O is represented in FIG. 1 by the characters FR placed face down on the object plane 4. These characters project along the first optical axis 8A and onto the image plane 6. The image characters FR projected along optical axis 8A in FIG. 1 are rotated 180° relative to the orientation of the object characters FR.

In a typical photocopying apparatus, the image is projected onto a photoreceptor, located at the image plane 6, and moving in a continual uni-directional movement as indicated by the arrow 7.

In a scanning mode of operation, the object O is reciprocated on the object plane 4, relative to the optical axis 8A along a path of travel indicated by the arrow 5. During this scanning, only a narrow band of the object is exposed at any time. This continual and progressive exposure results in a composite image of the scanned object. When the object O is moving in the scan direction 5A, its image is projected along first optical axis 8A and laid down on the moving photoreceptor as shown in FIG. 1. Now if the system geometry were maintained in the return direction of scan 5B, the image projected along optical axis 8A onto the image plane would be a wrong reading image. It is for this reason that the prior art typically does not expose the object on the return motion, but instead uses quick return devices to minimize the time lost during the return motion.

Figure 3:
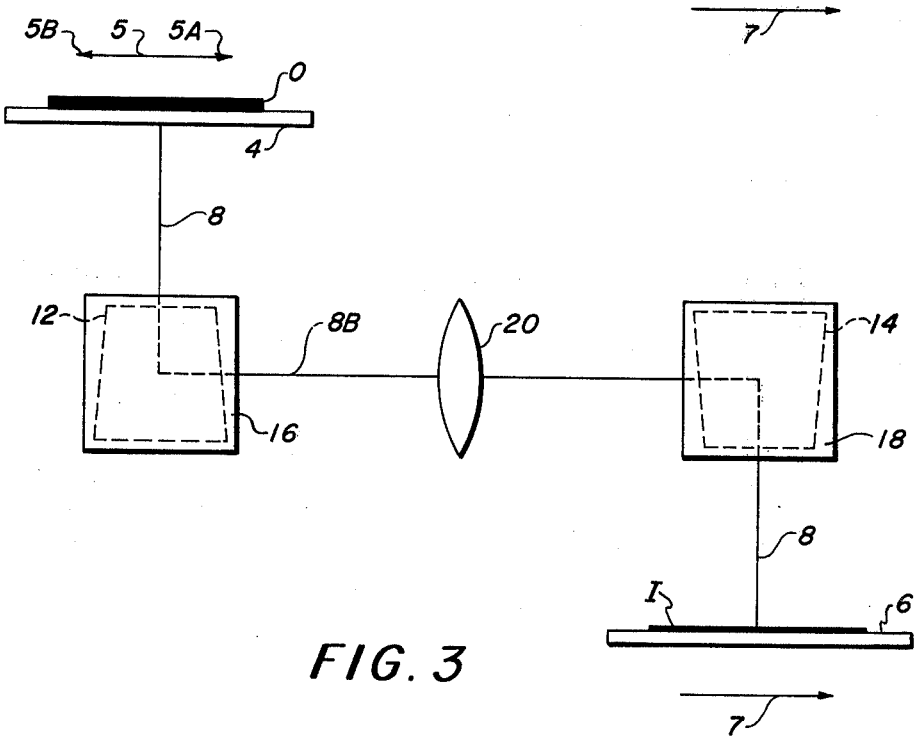
FIG. 3 is a front view taken along the line III—III of FIG. 1.
Figure 4:
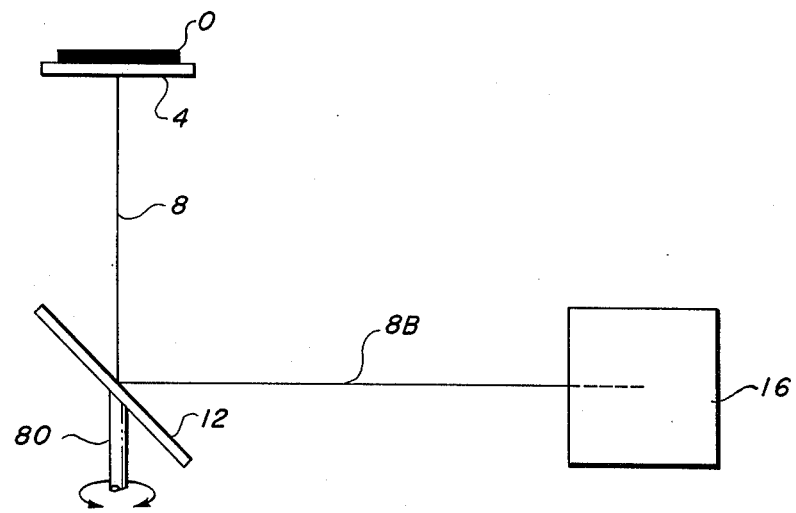
FIG. 4 is a view from the left side taken along the line IV—IV of FIG. 1.
Figure 5:
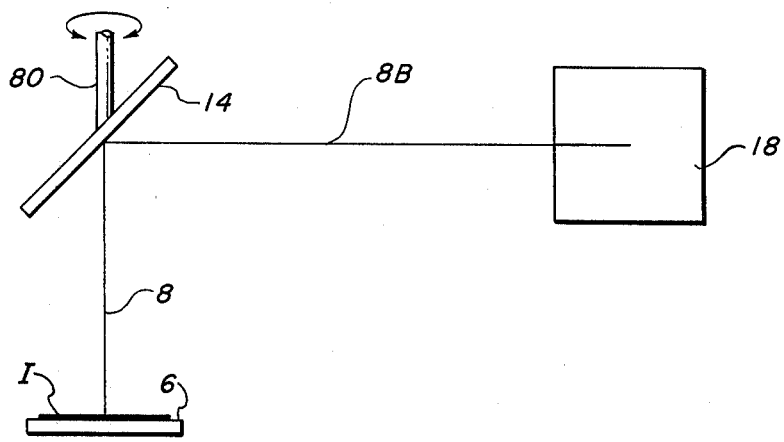
FIG. 5 is a view from the left side taken along the line V—V of FIG. 1.

Second typical axis 8B is provided for use during the reverse scanning motion in the direction 5B and is shown in plan view in FIG. 1 and in various elevations in FIGS. 3, 4, and 5. Optical axis 8B includes, in optical alignment between the object plane 4 and the image plane 6, the first reflector 12, a third reflector 16, a projection lens 20, a fourth reflector 18, and the second reflector 14. All of the mirrors 12, 14, 16, and 18 are shown as oriented at 40° relative to the optical axis so as to fold the same by 90°. These angles are convenient for illustration of the present invention, but the concept of this invention is not limited to such geometry.

Figure 1A:
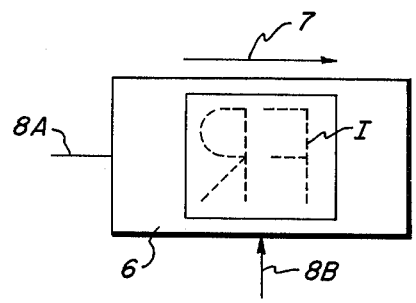
FIG. 1A is a partial view of the system of FIG. 1 illustrating an image orientation in the reverse object scan direction.

First reflector 12 and second reflector 14 are mounted for rotation on axes coincident with the optical axis 8. In the geometry illustrated, reflectors 12 and 14 are rotatable in 90° arcs about these axes 80 between successive reciprocal scan movements. In FIG. 2, the reflectors 12 and 14 are in position so that object plane 4 and image plane 6 are in optical communication along the first optical axis 8A. In FIGS. 3, 4, 5, reflectors 12 and 14 have been shifted 90° so that object plane 4 and image plane 6 are in optical communication along the second optical axis 8B. When the object O is imaged at I by means of the projection lens 20 along optical axis 8B, the characters FR are rotated 180° (FIG. 1A) relative to their orientation when projected along optical axis 8A (FIG. 1). During scanning, when the object O with its characters FR is moving in the scan direction 5B, its image is propagated along the second optical axis 8B, and laid down on the moving photoreceptor as shown in FIG. 1A. As viewed from the opposite side of the paper looking up at FIG. 1, it will be appreciated that the object is, of course, right reading, the only difference being that these successive images are rotated 180° relative to each other.

To summarize, when the object with its characters FR is moved in the scan direction 5A its image is projected along optical axis 8A onto the image plane at I as shown in FIG. 1. When the object characters FR are moved in the scan direction 5B, the image is projected along optical axis 8B onto the image plane at I as shown in FIG. 1A.

The rotatable reflectors 12 and 14 are operatively connected to the document reciprocal drive, as represented in the drawings by the dotted lines. The details of the reciprocating drive and of the reflector drive are not necessary to an understanding of the present invention. Indeed, such mechanism may take several forms. The essential thing is that the reflectors 12 and 14 ar in synchronism with the reciprocating motion of the object O. Thus, when the object O is moving in scan direction 5A, reflectors 12 and 14 are in position to project an image along optical axis 8A. At the end of the stroke in direction 5A, and before the return stroke in direction 5B, reflectors 12 and 14 are shifted so as to project along optical axis 8B.

It will be appreciated that the invention described herein provides a strip scanning optical system capable of projecting images during both directions of reciprocal scan movement. This has been done by optically rotating the optical axis or in effect, optically reversing the photoreceptor between successive scans. By projecting useful images in both directions of scan movement, clearly the ratio of useful time to lost time in the direction of a photocopying machine employing this invention is greatly increased.

The description given above has been with reference to a system in which the optics are stationary and the object is reciprocated. While this is presently preferred, it will be appreciated that the concept of the invention is not limited to such an arrangement. It is, of course, possible to have the object remain stationary and have the optical system reciprocate relative to it.

Reduced to its basics, the invention involves rotating a plane 180° about each of the coordinate axes lying in the plane. The effect of this is to rotate the plane 180° about the third coordinate axis, the axis normal to the plane.

In terms of an image projection system as is involved here, the propagating image wavefront is taken as a plane for the purpose of a frame of reference in describing and defining the geometry. The axis of propagation of the image is the axis normal to the plane and is the axis about which it is desired to rotate the image by 180°. In view of the foregoing, it will be clear that such concepts in the claims as image wavefront, planar wavefront, and coordinate axes lyig in the wavefront, are not limited to an actual plane wavefront environment. The planar wavefront image propagation is simply a useful aid to understanding the invention.

The foregoing description of an enbodiment of this invention is given by way of illustration and not of limitation. The concept and scope of the invention are limited only by the following claims and equivalents thereof which may occur to others skilled in the art.

What is claimed is:

1. An optical system for projecting an image of an object from an object plane to an image plane and having first and second optical axes extending between said object plane and said image plane, and including:
  a first reflector and a second reflector, both being movable between first and second operative positions,
  said first reflector, a first projection lens, and said second reflector disposed in optical alignment along said first optical axis when said first and second reflectors are in said first operative position,
  said first reflector, a third reflector, a second projection lens, a fourth reflector, and said second reflector disposed in optical alignment along said second optical axis when said first and second reflectors are in said second operative position,
  said optical system effective to project an image from said object plane to said image plane in a first orientation along said first optical axis, and in a second orientation, rotated 180° from said first orientation, along said second optical axis.

2. An optical scanning system for projecting an image of an object from an object plane to an image plane and having first and second optical axes extending between said object plane and said image plane, and including:
  a first reflector and a second reflector, both being movable between first and second operative positions,
  said first reflector, a first projection lens, and said second reflector disposed in optical alignment along said first optical axis when said first and second reflectors are in said first operative position,
  said first reflector, a third reflector, a second projection lens, a fourth reflector, and said second reflector disposed in optical alignment along said second optical axis when said first and second reflectors are in said second operative position,
  means to effect relative reciprocatory motion of said object and said optical scanning system,
  means to move said first and second reflectors from said first to said second operative positions at the end of said reciprocatory motion in one direction, and from second to said first operative positions at the end of said reciprocatory motion in the opposite direction,
  whereby said optical scanning system is effective to project an image from said object plane to said image plane in a first orientation along said first optical axis, and in a second orientation, rotated 180° from said first orientation along said second optical axis.

3. An optical scanning system for projecting an image of an object from an object plane to an image plane and having first and second optical axes extending between said object plane and said image plane, said image being in a first orientation at said image plane when projected along said first optical axis and in a second orientation, rotated 180° about the axis of propagation from said first orientation, when projected along said second optical axis, said system including:
- a lens to protect an image from said object plane to said image plane,
- a photoreceptor disposed for uni-directional motion at said image plane,
- drive means for effecting relative reciprocatory scanning motion of said object and said optical axes,
- optical axis drive means to place said object plane and said image plane in optical communication successively along said first and said second axes, and to switch between one to the other of said optical axes to the end of said reciprocatory motion in each direction,
- whereby said optical scanning system is effective to project an image of said object onto said moving photoreceptor during both directions of reciprocatory scanning motion.

4. An optical scanning system for projecting an image of an object from an object plane, in a propagating image wavefront along an axis of propagation in first and second optical paths, to an image plane including:
- a lens to project an image from said object plane to said image plane,
- a photoreceptor disposed for uni-directional motion at said image plane,
- drive means for effecting relative reciprocatory scanning motion of said object and said optical system,
- first and second reflectors disposed in said optical paths and selectively positionable in first operative positions in said first optical path and second operative positions in said second optical path,
- in said first operative positions, said first and second reflectors being effective to relay said propagating image wavefront in a first spatial orientation relative to said object,
- third and fourth reflectors disposed in said second optical path when said first and second reflectors are in their second operative positions,
- in said second operative positions, said first and second reflectors being effective to rotate said propagating image wavefront by 180° about one of two orthogonal axes lying in said image wavefront and normal to its axis of propagation, and said third and fourth reflectors being effective to rotate said propagating image wavefront by 180° about the other of said orthogonal axes lying in said image wavefront,
- means to place said first and second reflectors in said first operative positions for scanning motion in one direction and in said second operative positions for scanning motion in the reverse direction,
- whereby said image is projected in a first orientation during scanning in said one direction and in a second orientation, rotated 180° about said axis of propagation from said first orientation, during scanning in said reverse direction.

* * * * *